Patented June 18, 1940

2,205,115

UNITED STATES PATENT OFFICE 2,205,115

SILVER POLISH

Delbert F. Brown, Westfield, and Hugh C. De Hoff, Roselle Park, N. J., assignors to Standard Oil Development Company, a corporation of Delaware No Drawing. Application April 27, 1937, Serial No. 139,206

2 Claims. (Cl. 134—24)

This invention relates to a silver polish.

In U. S. Patent 1,927,916 disclosure is made of an emulsion containing a high percentage of alcohol, for example:

| | Parts |
|---|---|
| Ethyl alcohol | 40 |
| Gum tragacanth | 1 |
| White mineral oil | 12 |
| Water | 43 |

It has now been discovered that superior detergents and polishes can be prepared by incorporating into this emulsion other ingredients, particularly light, fluffy, solid powders without breaking the emulsions and yet maintain the emulsions in fluid form. It was originally considered, as stated in the original application, that an emulsion containing a high percentage of alcohol could be converted into a semi-solid salve-like preparation by the incorporation therein of solids, such as zinc oxide, calcium carbonate, or the like; but according to the present invention the emulsion is prepared in fluid form, thereby attaining marked advantages from several points of view.

An abrasive emulsion may be prepared according to the description given hereinbelow and has been found suitable for many different types of cleaning and polishing, but it is particularly valuable for cleaning and polishing of silverware and automobile headlight reflectors. Its particular value in this instance is attained by reason of the fact that silver polishes must clean without the use of coarse and scratching abrasives and without the application of much manual effort. On the other hand, the present product has also been found very suitable for cleaning other metals such as brass, gold, copper, platinum, nickel, or chronium plating, etc., as well as glass surfaces, such as windows, mirrors, etc.

The emulsion base to be used in carrying out the present invention should consist essentially of oil, water, an alcohol and an emulsifying agent. Generally, the oil may vary in content from as little as 1% up to 15% or more, depending upon the type and proportion of other ingredients used. The oil used may be any animal, vegetable, fish or mineral oil, although it is found preferable to use a mineral white oil, which is colorless and odorless. As a matter of fact, the oil may also be any synthetic type of oil or any liquid of suitable viscosity which is substantially insoluble in the alcohol solution used as the aqueous phase of the emulsion. In regulating the viscosity, instead of using a single or pure oil of the proper viscosity, a much thinner one can be used providing it is thickened up to the desired extent with a suitable oil-soluble thickener, such as a hydrocarbon polymer produced by polymerizing isobutylene at low temperature with boron fluoride as catalyst. Such isobutylene polymers have been prepared having a molecular weight ranging from about 200 or 300 up to 300,000 or more, a sample having a molecular weight of about 10,000 having been used with satisfactory results. The use of this or similar types of material having a high V. I. (viscosity index) has the advantage of producing an oil having a viscosity index of about 110–130 or so, which changes little in viscosity with temperature variations, and hence produces a temperature-stable emulsion. The use of such V. I. improving thickeners in emulsions containing a large amount of lower aliphatic alcohol is claimed broadly in our copending application, Serial No. 179,666, filed December 14, 1937.

The invention is particularly applicable to the use of lower monohydric aliphatic alcohols, e. g. methyl, ethyl, propyl, and isopropyl, or even tertiary butyl alcohol or mixtures thereof, although it may also be applied to polyhydric alcohols, such as glycol, glycerine and the like. It is well known that the lower monohydric alcohols, such as ethyl alcohol and the like, normally tend to break emulsions and hence it is very surprising to find that substantially stable fluid emulsions can be made containing such alcohols and also containing substantial amounts of finely-divided solids which also tend to break emulsions, particularly those containing any lower alcohol. The specific choice of the alcohol depends upon the rate of evaporation desired as well as the relative supply and cost of each. The quantity of alcohol to be incorporated in the emulsion may vary from between the approximate limits of 15 and 50%. The emulsifying agent preferred is a natural gum of the order of Leguminosae, preferably gum tragacanth, although others, such as kayari, acacia, etc., may be used. Ordinarily, the amount of emulsifying agent required is between the approximate limits of ½ to 1½%, especially if gum tragacanth is used, although up to 5% or more may be required.

Of the solid powders to be added, the one of the abrasives which has been found most suitable is known commercially as Celite Superfloss; it is an extremely light, fluffy, finely-divided, silica abrasive. It is particularly suitable for polishing silver because it does not scratch the metal. Other coarser grades of silica and other types of abrasives may be used, for instance, rouge, diatomaceous earth, and various types of clays and other polishing powders may be used, such as chalk dust, lamp black, etc. Although it is possible to incorporate small amounts of the heavier types of abrasives, it is preferable to use a light, fluffy abrasive because in so doing a much larger quantity can be incorporated into the emulsion without breaking the emulsion and causing the suspended solids to settle. When Celite Superfloss is used as the abrasive, as much as 10 or 15% or even 20% or more can be incorporated in the emulsion.

Solid powders other than abrasives may be used, for example, zinc oxide, calamine (which is a mixture consisting essentially of zinc oxide with a small amount of iron oxide), magnesium oxide, flowers of sulfur, etc. When using the heavier powders, such as zinc oxide, they should be finely divided and the amount to be used cannot be quite as much as of the light-weight powders; usually only 5 to 10 or 15% can be used.

The degree of fineness of the solid powders is a more important factor than is the density of the powder, because in a series of comparative tests using different powders, namely, a fine silica (passing through 300 mesh) and a course silica (just passing 180 mesh), a course barium sulfate (passing 180 mesh and retained on 250 mesh), a fine zinc oxide (passing through 250 mesh) and a coarse zinc oxide (just passing 180 mesh), all of the coarse powders passing 180 mesh failed to produce emulsions which were stable both about three days, whereas the fine zinc oxide made an emulsion still stable after several weeks, and the very fine silica passing 300 mesh gave emulsions which have remained stable for many months. (In these tests the same amount of powder was used, namely, 125 g. per 1000 cc. of emulsions.) It is, therefore, particularly preferred to use powders having a fineness such that they will substantially all pass through 250 mesh sieve.

Emulsions containing finely-comminuted solids which have a beneficial effect on the human skin, such as zinc oxide, etc., may be used in the preparation of emulsions for use as hand lotions and topical remedies, etc. Mixtures of two or more different grades or types of powders may be used in preparing an emulsion having a certain desired blend of properties.

In addition to the above ingredients, it may also be desirable to incorporate into the emulsion certain other addition agents intended to modify one or more of the properties of the ingredients already present or to increase the detergent or polishing property of the emulsion. For example, certain types of solvents may be incorporated, such as ortho-dichlorobenzene, preferably in amounts less than 1%. Other types of modifiers may be added, for example, esters, such as secondary amyl acetate or ethyl acetate, ketones, high boiling alcohols or organic acids, such as oxalic acid and the like, or inorganic chemical compounds in small amounts, for instance, ammonium oxalate, ammonium chloride, tri-sodium phosphate, borax and sodium cyanide. Of all of these modifying ingredients, ammonium oxalate has been found to be one of the most effective when the emulsion is to be used as a silver polish. In incorporating these various chemical compounds or modifiers it should be kept in mind that the hydrogen ion concentration of the aqueous phase of the emulsion should generally be maintained within the approximate limits of 6.5 to 7.5.

In carrying out the invention, it has been found preferable to first mix the emulsifying agent, such as gum tragacanth, with the alcohol and then add the water, allowing a short time for the swelling of the gum in the alcohol solution. Ordinarily no heat is required for this swelling. Next, the Superfloss or other abrasive powder is added and well agitated and finally the oil is added with agitation, with the result that the entire composition is converted into an emulsion. Any other satisfactory method of preparing the emulsion may be used. Water-soluble modifiers should be added with the water.

For the sake of illustration, but not intending that the invention be limited thereby, several examples are given:

EXAMPLE 1

| | Per cent/volume |
|---|---|
| Tragacanth | 1.0 |
| Isopropyl alcohol (91% concentration) | 35.0 |
| Commercial mineral white oil having a viscosity of 85–100 seconds at 100° F | 2.5 |
| Silica abrasive (Celite Superfloss) | 12.5 |
| Water | 49.0 |
| | 100.0 |

This emulsion was used for polishing silver and was found to spread on very easily and polish quickly, removing the dirt very readily from cracks and crevices and also was very easily removed in polishing.

EXAMPLE 2

A composition similar to that shown in Example 1 was used together with an addition of 1% of ammonium oxalate. This helped to bring out a high lustre when used as a silver polish.

EXAMPLE 3

The following composition was found very satisfactory as an automobile headlight reflector cleaner:

*Auto polish*

| | Percent/Weight |
|---|---|
| Tragacanth | 1 |
| Isopropyl alcohol (91%) | 27 |
| Water | 45 |
| Abrasive (e. g. Celite) | 12 |
| Oil (Spindle oil @ 30 sec. vis./100° F. Saybolt) | 15 |
| | 100 |

EXAMPLE 4

| | Percent/weight |
|---|---|
| Tragacanth | 1 |
| Abrasive slightly coarser than that used in Example 1 | 20 |
| Isopropyl alcohol | 30 |
| Oil | 2 |
| Water | 47 |
| | 100 |

This emulsion was found very satisfactory for cleaning windows.

| Formula No. | 6 | 7 | 8 | 9 | 10 | 11 | 12 |
|---|---|---|---|---|---|---|---|
| Tragacanth | 0.5 | 0.5 | 1.0 | 1.0 | 1.5 | 1.5 | 1.5 |
| Alc. (i-prop. 91%) | 15 | 15 | 27 | 15 | 15 | 25 | 25 |
| Water | 67.5 | 59.5 | 45 | 54 | 53.5 | 58.5 | 61.5 |
| Light powder, e. g. Superfloss | 15 | 15 | 15 | 15 | 15 | 10 | 10 |
| Marcol* | 2 | 10 | 12 | 15 | 15 | 5 | 2 |
| Consistency | Med. thick | Med. thick | Med. thin | Thick | Nearly solid | Med. thick | Fairly thin |

*Mineral white oil having a viscosity of about 90 sec. Saybolt at 100° F.

The following emulsion is useful as a lotion suitable for applying to the skin in cases of acne, eczema, poison ivy, and various other skin rashes of similar type, as well as for sunburn:

EXAMPLE 5

| | Percent/weight |
|---|---|
| Tragacanth | 1 |
| Ethyl alcohol | 30 |
| Water | 52 |
| Calamine (2% $Fe_2O_3$, 98% ZnO) | 12 |
| Castor oil | 5 |
| | 100 |

The following table is given to illustrate how the proportions of the various ingredients may be varied:

It is not intended that the invention be limited by any of the specific examples given, nor by any theory of operation of the invention.

We claim:

1. A cleaning and polishing emulsion having approximately the following composition: about 15 to 50% of a low molecular weight aliphatic alcohol, about ½ to 2% of gum tragacanth, about 1 to 5% of an oil, about 5 to 25% of light finely-divided abrasive powder, and the balance water.

2. A silver polish in fluid emulsion form comprising approximately the following composition: 1% of gum tragacanth, 12.5% of light fluffy silica abrasive, 35% of isopropyl alcohol, 2.5% of mineral white oil and the balance water.

DELBERT F. BROWN.
HUGH C. DE HOFF.